US012723545B2

(12) United States Patent
Weicker et al.

(10) Patent No.: US 12,723,545 B2
(45) Date of Patent: Sep. 1, 2026

(54) TRIPLE-FLOW AXIAL TURBOMACHINE COMPRISING A DIVERGING HEAT EXCHANGER IN THE THIRD FLOW

(71) Applicant: SAFRAN AERO BOOSTERS SA, Herstal (BE)

(72) Inventors: David Weicker, Rhode-Saint-Genèse (BE); Florian Cleyet, Rhode-Saint-Genèse (BE); Bruno Servais, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 34 days.

(21) Appl. No.: 18/714,257

(22) PCT Filed: Nov. 30, 2022

(86) PCT No.: PCT/EP2022/083778
§ 371 (c)(1),
(2) Date: May 29, 2024

(87) PCT Pub. No.: WO2023/099527
PCT Pub. Date: Jun. 8, 2023

(65) Prior Publication Data

US 2025/0020079 A1 Jan. 16, 2025

(30) Foreign Application Priority Data

Nov. 30, 2021 (EP) .................................... 21211400
Dec. 14, 2021 (BE) .................................. 2021/5978

(51) Int. Cl.
*F02C 7/14* (2006.01)
*F02C 3/06* (2006.01)
(Continued)

(52) U.S. Cl.
CPC .................. *F02C 7/14* (2013.01); *F02C 3/06* (2013.01); *F02C 7/18* (2013.01); *F02K 3/077* (2013.01); *F05D 2260/213* (2013.01)

(58) Field of Classification Search
CPC ............... F01D 25/12; F05D 2260/211; F05D 2260/213; F05D 2260/20; F02K 3/077;
(Continued)

(56) References Cited

U.S. PATENT DOCUMENTS 10,634,054 B2 * 4/2020 Schmitz .................. B22F 5/009
10,907,500 B2 2/2021 Wong et al.
(Continued)

FOREIGN PATENT DOCUMENTS

EP 3674531 A1 7/2020

OTHER PUBLICATIONS

International Search Report for PCT/EP2022/083778, dated Mar. 31, 2023, 19 pages.

*Primary Examiner* — Nathaniel E Wiehe
(74) *Attorney, Agent, or Firm* — Rankin, Hill & Clark LLP

(57) ABSTRACT

An axial turbomachine including a first separation nozzle capable of separating an incoming air flow into a radially internal air flow and a flow of radially external air, called secondary flow; a second separation nozzle capable of separating the radially internal air flow into a primary flow and a tertiary flow in a tertiary flow vein radially external to the primary flow; and a heat exchanger disposed in the tertiary flow vein. The heat exchanger extends radially and axially in an upstream section of the tertiary flow vein, having a divergent longitudinal section. The tertiary flow vein includes a downstream section presenting a converging longitudinal section, following the tertiary flow.

20 Claims, 6 Drawing Sheets

(51) Int. Cl.
*F02C 7/18* (2006.01)
*F02K 3/077* (2006.01)

(58) Field of Classification Search
CPC .. F02K 3/025; F02C 7/14; F02C 7/143; F02C 7/18; F02C 7/12; F28D 2021/0026; F28D 7/082; F28D 7/005; F28F 13/08
See application file for complete search history.

(56) References Cited

U.S. PATENT DOCUMENTS

2014/0216056 A1* 8/2014 Schwarz .................. F02C 7/12 415/178
2015/0361891 A1* 12/2015 Schwarz .................. F02C 7/14 60/39.83
2019/0204010 A1* 7/2019 Breeze-Stringfellow .................... F28F 13/08
2020/0240328 A1 7/2020 Schmitz
2025/0264038 A1* 8/2025 Princivalle ............. F28F 13/08

* cited by examiner

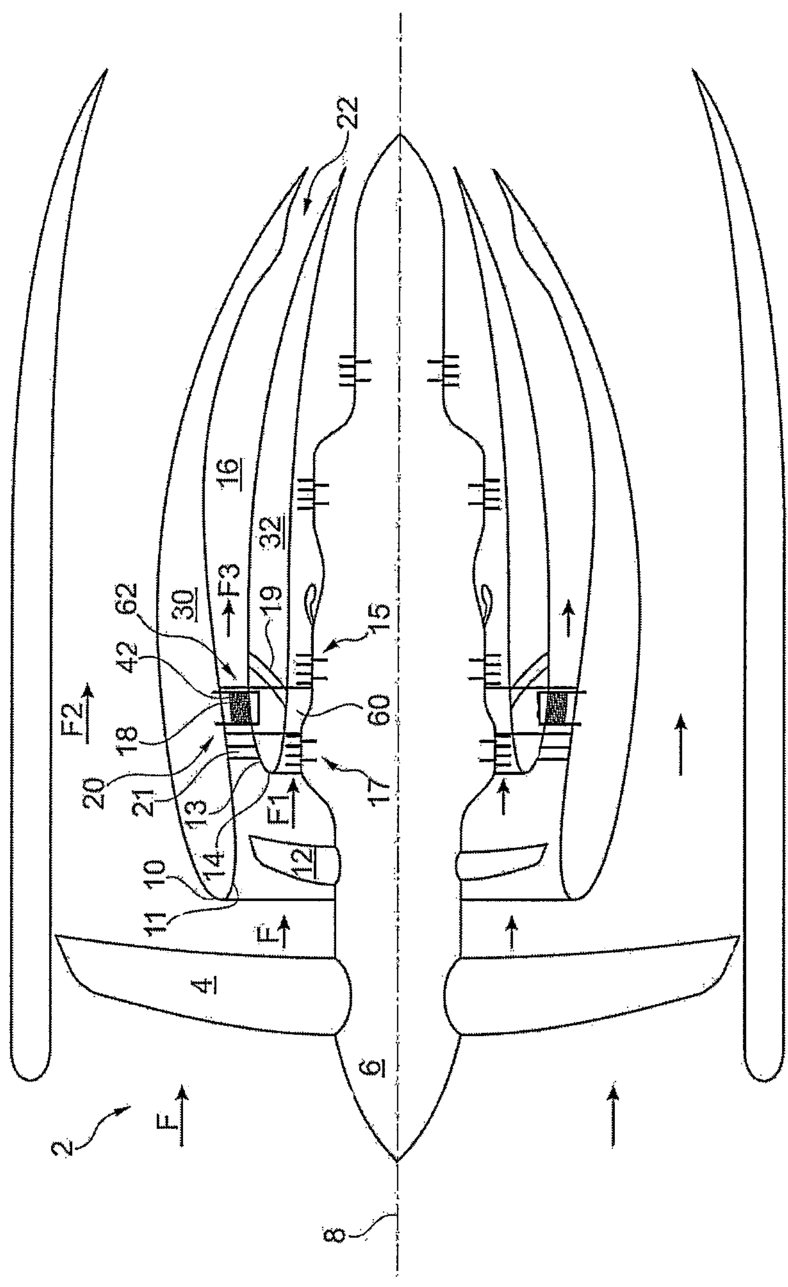
[Fig 1]

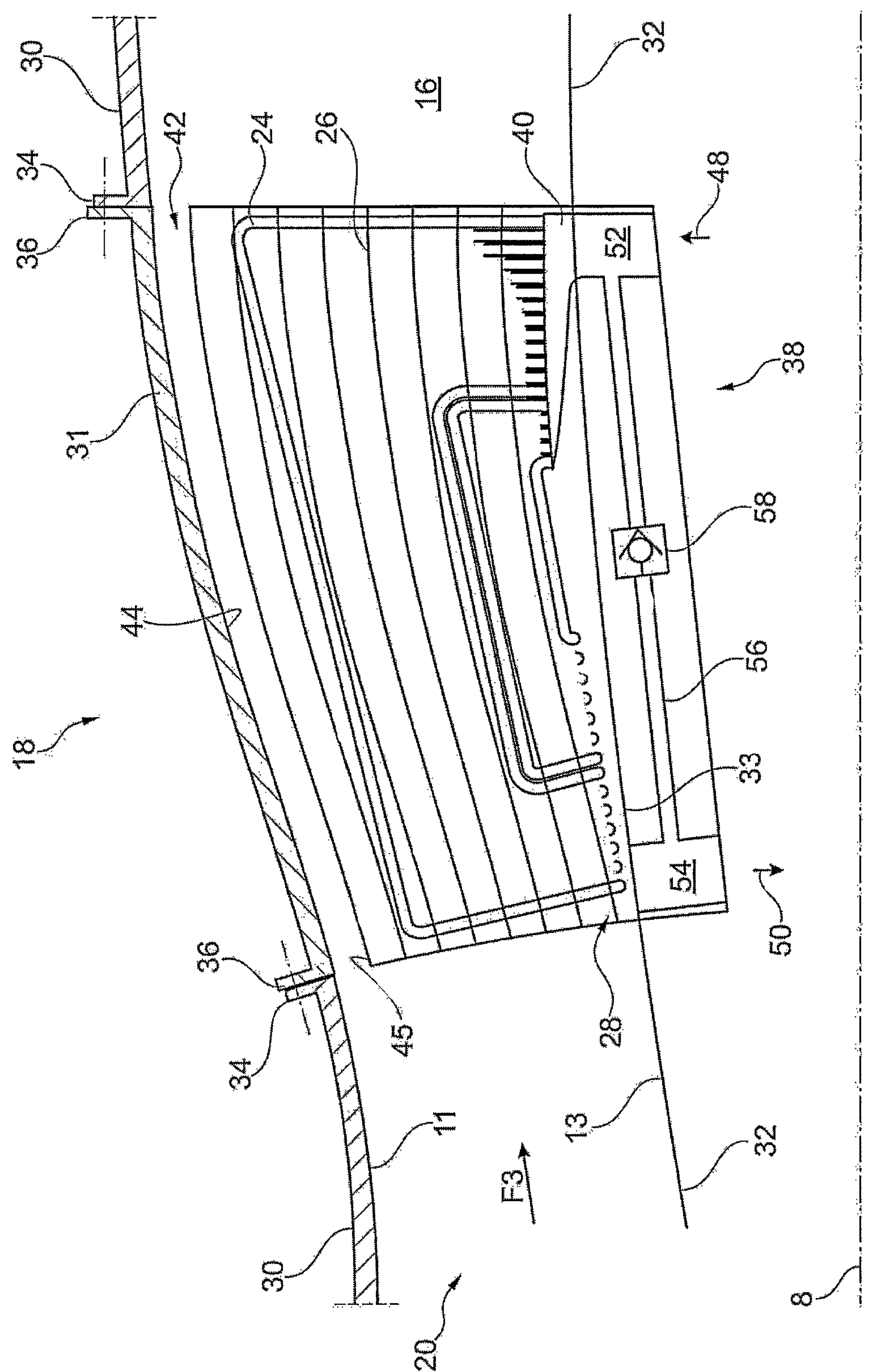
[Fig 2]

[Fig 3]
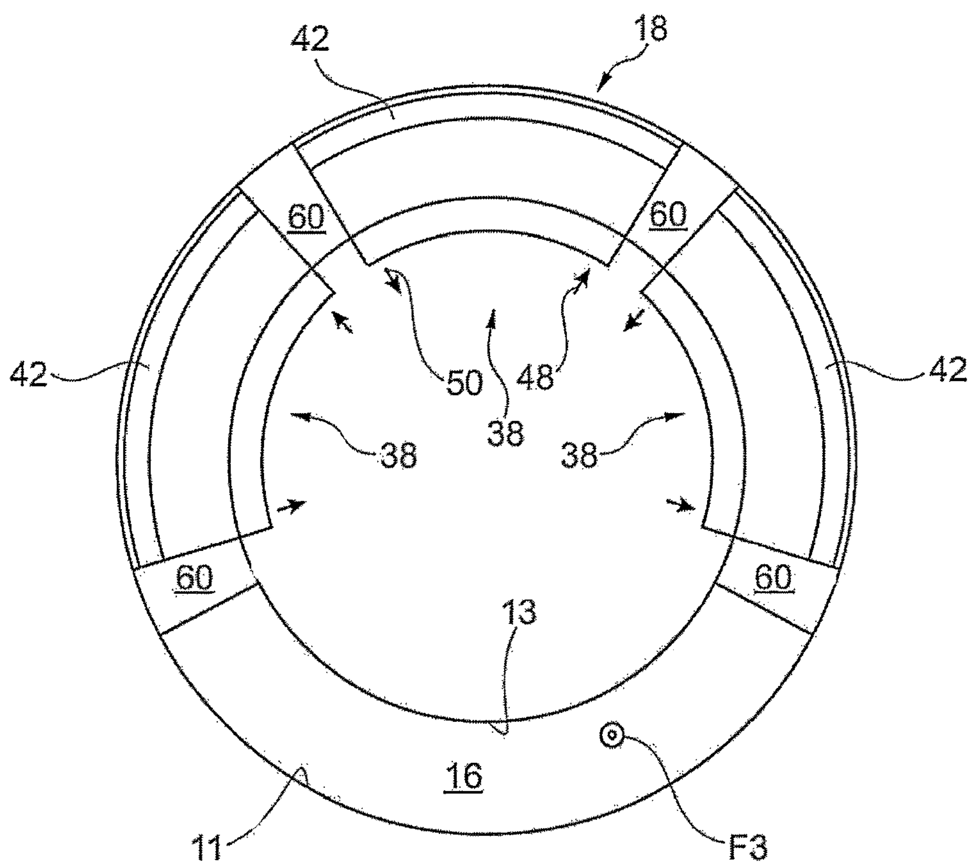
[Fig 4]
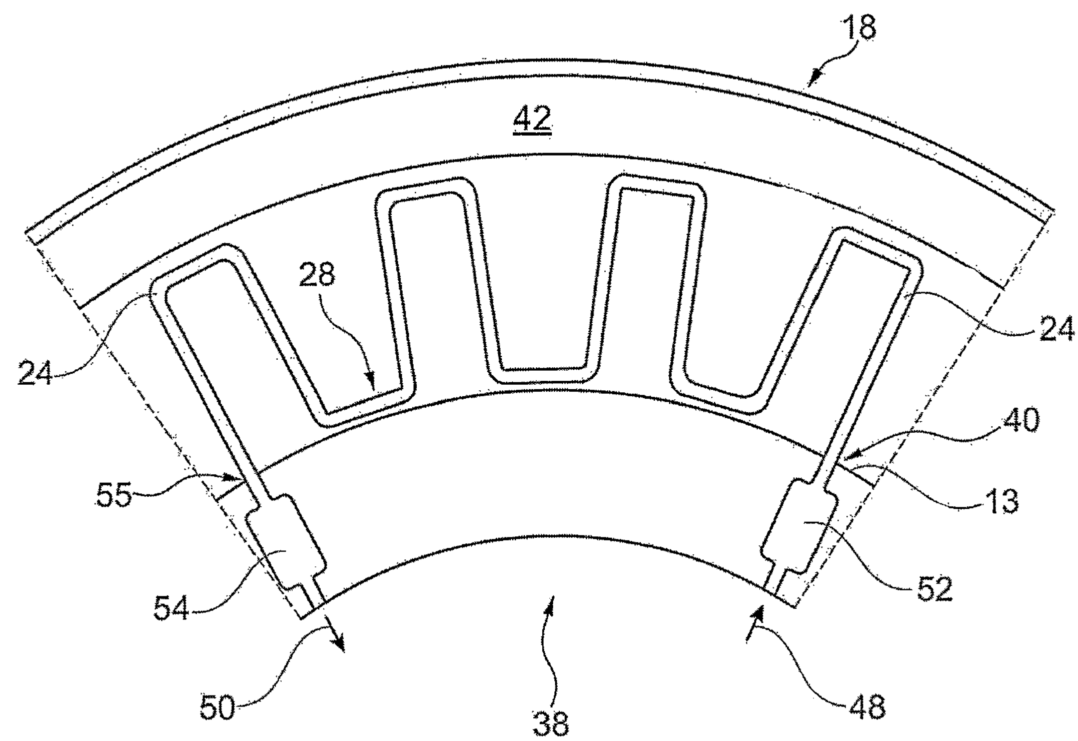

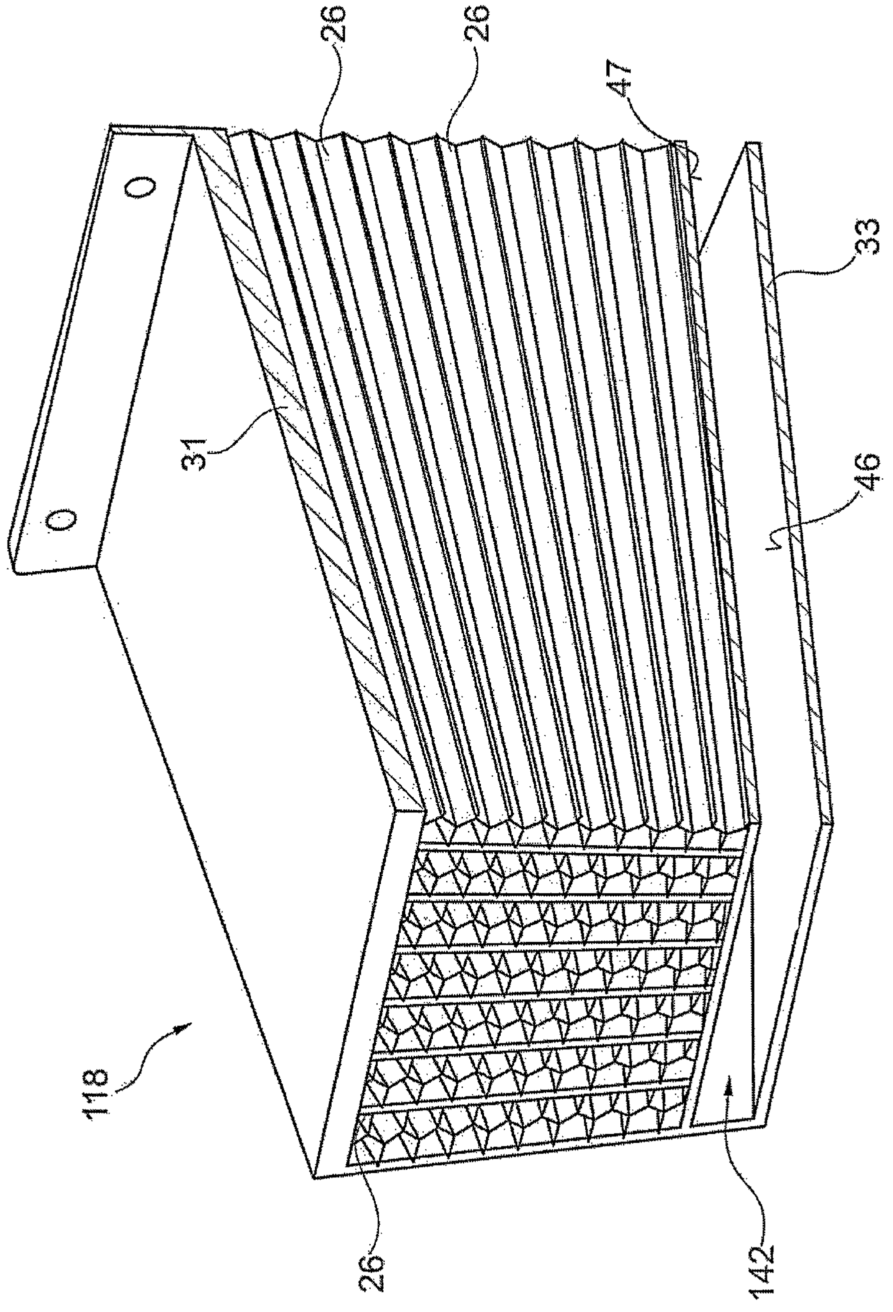
[Fig 5]

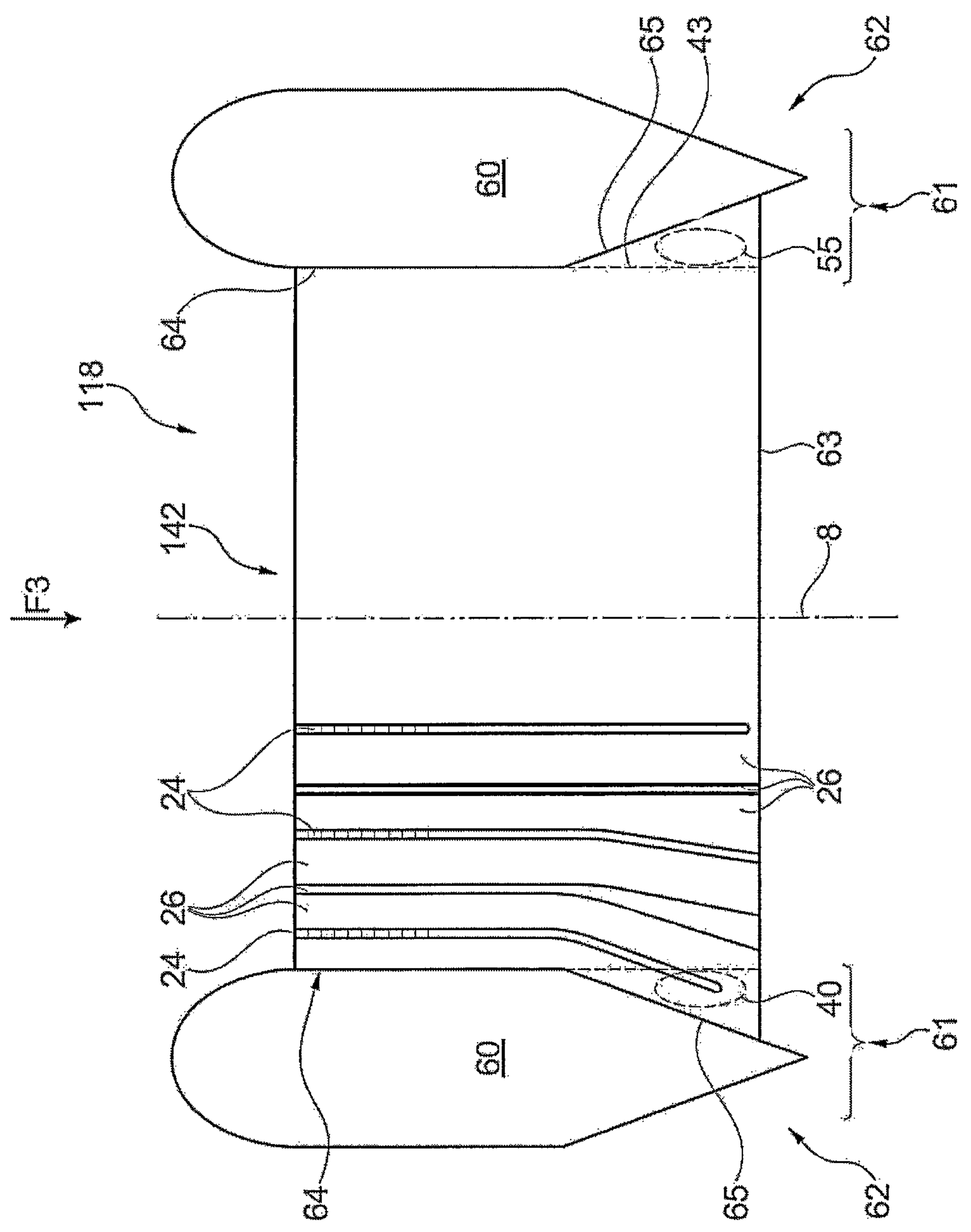
[Fig 6]

[Fig 7]
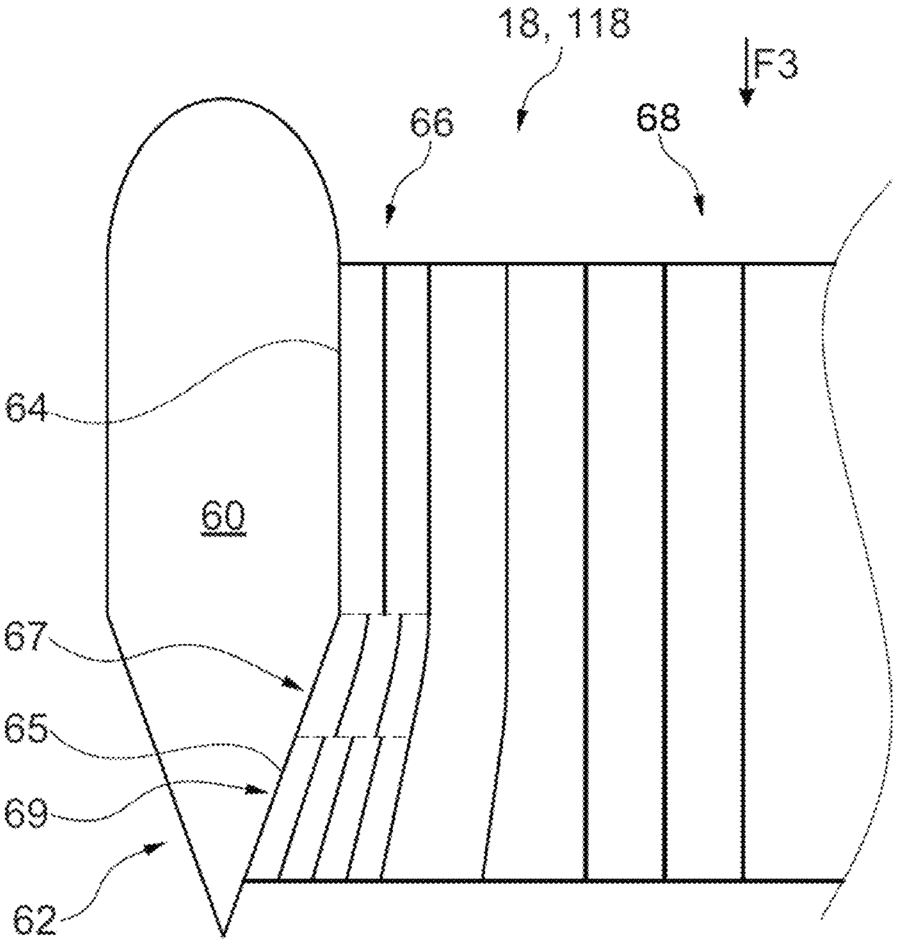
[Fig 8]
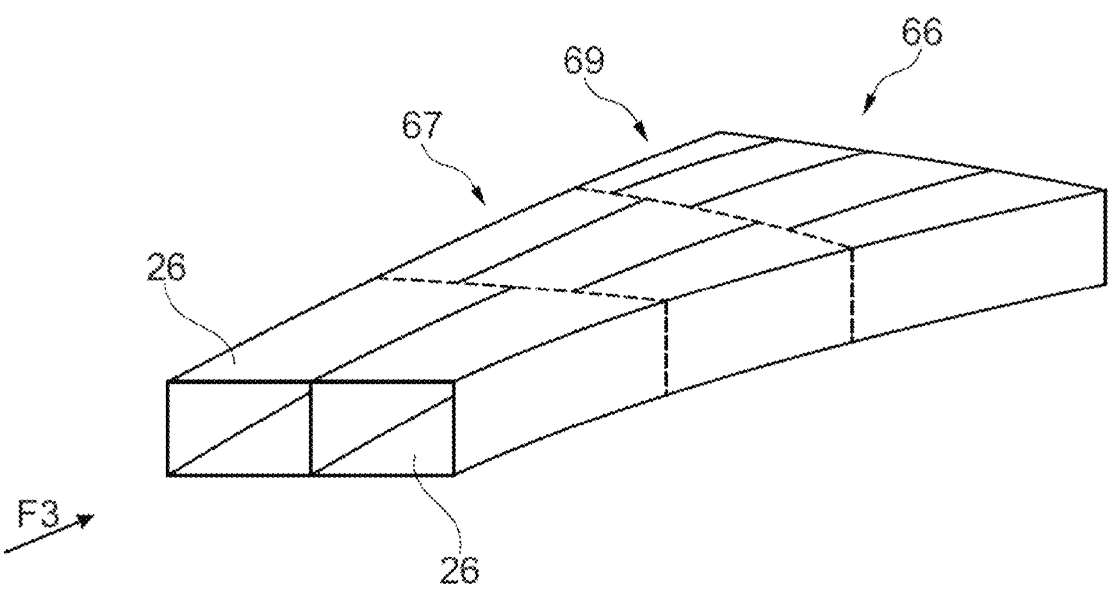

TRIPLE-FLOW AXIAL TURBOMACHINE COMPRISING A DIVERGING HEAT EXCHANGER IN THE THIRD FLOW

DOMAIN

The invention relates to the field of turbomachines and more particularly three-flow turbomachines. The invention relates to the arrangement of a heat exchanger intended for cooling the oil of the turbomachine.

PRIOR ART

In a turbomachine (turbojet), it is generally necessary to cool the oil in the lubrication circuit. For this purpose, it is known to place one or more heat exchanger(s) in the secondary flow, that is to say downstream of the fan.

However, the provision of a heat exchanger at the secondary circuit penalizes the performance and overall efficiency of the turbomachine. In fact, the thrust force generated by the fan is partly slowed down by the bulky exchanger. In addition, aerodynamic disturbances in the secondary flow may occur, leading to vibrations and noise pollution.

The published patent document EP 3 674 531 A1 discloses an air-oil type heat exchanger arranged in the vein of the secondary flow. Such a heat exchanger generates significant disturbances in the secondary flow stream. In fact, the air traveling in this vein has a speed too high for aerodynamic or thrust losses to be negligible.

The published patent document U.S. Pat. No. 10,907,500 A1 discloses a turbojet comprising a heat exchanger integrated inside a nacelle of said turbojet.

The state of the art therefore presents disadvantages relating to performance penalties, to which is added the constraint linked to the fragility of the exchanger. Indeed, it cannot be placed directly upstream of the turbomachine to avoid disrupting its thrust force, in particular because of the risk of impact with foreign bodies which could penetrate into the turbomachine.

SUMMARY OF THE INVENTION

Technical Problem

The invention aims to resolve the drawbacks of the design/manufacture of turbomachines of the state of the art. In particular, the invention aims to propose a solution which allows effective cooling in a restricted space while reducing the impact on the efficiency of the turbomachine.

Technical Solution

The invention relates to an axial turbomachine, comprising: a first separation nozzle capable of separating an incoming air flow into a radially internal air flow and a radially external air flow, called a secondary flow; a second separation nozzle capable of separating the radially internal air flow into a primary flow and a tertiary flow in a tertiary flow vein radially external to said primary flow; and a heat exchanger disposed in the tertiary flow vein; wherein the heat exchanger extends radially and axially in an upstream section of the tertiary flow vein, having a divergent longitudinal section, said tertiary flow vein comprising a downstream section having a convergent longitudinal section, following the tertiary flow.

According to an advantageous mode of the invention, the heat exchanger is arranged axially between a low pressure compressor and a high pressure compressor.

According to an advantageous embodiment of the invention, said turbomachine comprises a movable wheel traversed by the radially internal flow, and further comprises, a stator crossed by the tertiary flow and arranged upstream of the exchanger, said movable wheel is arranged in upstream of said stator.

According to an advantageous mode of the invention, the heat exchanger is of the air/oil type with oil passages and heat exchange surfaces with air, in contact with said oil passages, said oil passages and said exchange surfaces having a divergent longitudinal section following the tertiary flow.

According to an advantageous mode of the invention, the oil passages extend, over at least 80% of a cumulative length of said oil passages, in longitudinal planes distributed angularly around the longitudinal axis.

According to an advantageous embodiment of the invention, the upstream section of the tertiary flow vein comprises an external casing forming an integral part of an external intermediate casing, said external intermediate casing being integral with the heat exchanger.

According to an advantageous embodiment of the invention, the upstream section of the tertiary flow vein comprises an internal casing forming an integral part of an internal intermediate casing, said internal intermediate casing being integral with the heat exchanger.

According to an advantageous mode of the invention, the oil passages and/or the heat exchange surfaces with the air are integrally formed with the external intermediate casing and/or the internal intermediate casing being integral with the heat exchanger.

According to an advantageous mode of the invention, the heat exchanger comprises, over a total extent of the heat exchanger following the tertiary flow, a free portion of material forming an air by-pass.

According to an advantageous mode of the invention, the air by-pass is adjacent to the external casing of the upstream section of the tertiary flow vein.

According to an advantageous mode of the invention, the air by-pass is delimited radially outwards by the external intermediate casing.

According to an advantageous embodiment of the invention, the air by-pass is delimited radially outwards by an upper face belonging to the external intermediate casing of the heat exchanger, said upper face being adjacent to the external casing.

According to an advantageous embodiment of the invention, the air by-pass is adjacent to the internal casing of the upstream section of the tertiary flow vein.

According to an advantageous embodiment of the invention, the air by-pass is delimited radially inwards by the internal intermediate casing.

According to an advantageous embodiment of the invention, the air by-pass is delimited radially inwards by a lower face belonging to the internal intermediate casing of the heat exchanger, said lower face being adjacent to the internal casing.

According to an advantageous embodiment of the invention, the air by-pass extends radially over a height corresponding to a maximum of 15% of a corresponding total radial height of the divergent longitudinal section of the tertiary flow vein.

According to an advantageous embodiment of the invention, the first separation nozzle comprises an internal wall forming a first external guide wall of the radially internal air flow, said first external guide wall forming a convex profile seen from said air flow radially internal upstream of the heat exchanger.

According to an advantageous embodiment of the invention, the second separation nozzle comprises an external wall forming a second external guide wall of the radially internal air flow having passed through a movable wheel, said second external guide wall forming a convex profile seen from the tertiary flow upstream of the heat exchanger.

According to an advantageous embodiment of the invention, the internal casing comprises a "VBV" channel having an outlet disposed at the level of the tertiary flow vein, said outlet being arranged downstream of the exchanger.

According to an advantageous embodiment of the invention, the heat exchanger extends continuously or discontinuously over 360° around the longitudinal axis.

Advantages of the Invention

The invention is particularly advantageous in that it allows air to circulate in the heat exchanger which is cold and at a slow speed, thanks to the divergence of the exchanger in the direction of flow of the air, thus ensuring cooling efficiency. Indeed, good cooling efficiency allows the use of less imposing exchangers and therefore less bulky, less heavy and less expensive.

Furthermore, the positioning of the exchanger at the level of the tertiary flow vein makes it possible to reduce the risk of hindering the efficiency of the engine, which results in energy efficiency and optimized thrust which advantageously makes it possible to reduce carbonic gas emissions.

DESCRIPTION OF THE DESIGNS

FIG. 1 is a longitudinal sectional view of a turbomachine comprising a heat exchanger, according to a first embodiment of the invention;

FIG. 2 is a detailed view of the heat exchanger of the turbomachine of FIG. 1;

FIG. 3 is a front view of the tertiary flow vein comprising the heat exchanger, according to the first embodiment;

FIG. 4 schematically illustrates the oil paths in the heat exchanger on an angular sector, according to the first embodiment;

FIG. 5 is a perspective and longitudinal section of a heat exchanger of a turbomachine according to a second embodiment;

FIG. 6 shows a sectional view from above of the heat exchanger in the tertiary flow vein according to the second embodiment;

FIG. 7 shows a partial top view of the heat exchanger according to a third embodiment;

FIG. 8 illustrates an evolution of density of the heat exchange surfaces in the axial and circumferential directions.

DESCRIPTION OF AN EMBODIMENT

In the description which follows, the terms "internal" and "external" refer to positioning relative to the longitudinal axis of rotation of a turbomachine. The axial direction corresponds to the direction along the longitudinal axis of rotation of the turbomachine. The radial direction is perpendicular to the longitudinal axis. Upstream and downstream refer to the direction of flow of a flow in the turbomachine.

The figures show the elements schematically and are not represented to scale. In particular, certain dimensions are enlarged to facilitate reading of the figures.

FIG. 1 illustrates a turbomachine 2 according to a first embodiment. A propeller 4 secured to a hub 6 rotates around a longitudinal axis 8.

The turbomachine 2 moves in an air flow F whose movement relative to the turbomachine 2 is generated by the rotation of the propeller 4 and the advancement of the aircraft on which the turbomachine 2 is mounted.

The air flow F is separated by a first separation nozzle 10 into a radially internal air flow F' and a radially external air flow F2, called secondary flow F2. The propeller 4 can be placed upstream of the first separation nozzle 10 or downstream.

The radially internal air flow F' passes through a movable wheel 12 which directs the latter towards a second separation nozzle 14 capable of separating the radially internal air flow F' into a primary flow F1 and a tertiary flow F3, the latter is distinct from the secondary flow F2.

The first separation nozzle 10 comprises an internal wall forming a first external guide wall 11 of the radially internal air flow F', said first external guide wall 11 forming a convex profile seen from said radially internal air flow F'.

The second separation nozzle 14 comprises an external wall forming a second external guide wall 13 of the radially internal air flow F' having passed through the movable wheel 12, said second external guide wall 13 forming a convex profile seen from the tertiary flow F3.

The tertiary flow F3 enters a tertiary flow vein 16 radially external to said primary flow F1. The tertiary flow F3 passes through a heat exchanger 18 placed in the tertiary flow vein 16.

We can see in FIG. 1 that the turbomachine 2 is illustrated symmetrically with respect to the longitudinal axis 8. In fact, the tertiary flow vein 16 is annular and circumferentially continuous over 360° around the longitudinal axis 8. For this purpose, the tertiary flow F3 is a flow which passes annularly through the tertiary flow vein 16.

In this configuration, the tertiary flow F3 extends essentially in the axial direction and in a position radially between the primary flow F1 and the secondary flow F2.

The tertiary flow F3 extends in the tertiary flow vein 16 from the radially internal air flow F' downstream of the moving wheel 12 and to the secondary flow F2 after passing through the heat exchanger 18.

The turbomachine 2 further comprises a stator 21 arranged upstream of the heat exchanger 18 at the level of the tertiary flow stream 16.

The stator 21 corresponds to a row of stator vanes 21 arranged in the tertiary flow vein downstream of the separation nozzle 14. Alternatively, the stator 21 can be arranged upstream of the separation nozzle 14 and downstream of the moving wheel 12.

Advantageously, the stator 21 makes it possible to straighten the tertiary flow F3 before the latter passes through the heat exchanger 18 in order to minimize the aerodynamic disturbances of the tertiary flow F3 which can be caused by the moving wheel 12, this makes it possible to optimize the heat exchange between air and oil.

The heat exchanger 18 extends radially and axially in an upstream section 20 of the tertiary flow stream 16, having a longitudinal section divergent in the direction of flow of the tertiary flow F3.

The heat exchanger 18 can axially overlap a high pressure compressor 15 as well as a low pressure compressor 17, called "booster" 17, said heat exchanger 18 can also be positioned axially above the low pressure compressor 17. Preferably, the heat exchanger 18 is arranged axially between the low pressure compressor 17 and the high pressure compressor 15.

A “VBV” channel 19 (Variable Bleed Valve) having an outlet passing through an internal wall of the tertiary flow vein 16 and arranged axially downstream of the heat exchanger 18, the “VBV” channel makes it possible to ensure a function of discharge by returning part of the primary flow F1 to the tertiary flow F3, this makes it possible to evacuate for example any ice particles from the primary flow F1 to avoid jamming of the high pressure compressor 15, in particular when the flow rate of the primary flow F1 becomes too weak.

Advantageously, the arrangement of the outlet of the “VBV” channel 19 downstream of the heat exchanger 18 makes it possible to protect the latter from a possible risk of blockage.

The heat exchanger 18 can extend continuously over 360° in the upstream section 20 of the vein 16 around the longitudinal axis 8 of the turbomachine 2. Preferably, the heat exchanger 18 extends so discontinuous over 360° around the longitudinal axis 8 by subdividing into several angular segments and each can ensure a heat exchange function between the air and the oil which can be different from one segment to another. Examples of the different heat exchange functions will be given later in this description.

The tertiary flow F3 passes through the heat exchanger 18 occupying the upstream section 20 of the vein 16 at a speed having a Mach number included in an interval ranging from 0.1 to 0.6, generally 0.3. Advantageously, the divergence of the upstream section 20 of the vein 16 makes it possible to contribute to the slowing down of the air by reducing its speed.

The tertiary flow vein 16 also comprises a downstream section 22 having a converging longitudinal section following the tertiary flow F3. Advantageously, this makes it possible to accelerate the tertiary flow F3 at its exit from the heat exchanger 18, thus joining the secondary flow F2 to promote the thrust of the aircraft.

The heat exchanger 18 is of the “ACOC” type, acronym for the English expression “Air-Cooled Oil Cooler”, comprising oil passages which extend in the tertiary flow vein, said oil passages extend particularly in a radial and axial direction between an upper wall and a lower wall of said heat exchanger 18.

Indeed, the heat exchanger 18 of the present invention is different from a surface air-oil exchanger “SACOC”, in which the oil remains in the lower and upper walls and does not pass through the exchanger radially.

Advantageously, the “ACOC” heat exchanger 18 allows heat exchange between the air and the oil, preferably cooling of the oil by air. In fact, the oil temperature can reach an operating temperature of up to 180° C. and a flow rate of up to 30,000 l/h.

In this regard, the exchanger 18 can ensure the cooling of the oil used in several components of the aircraft, in particular, an engine, a gearbox, an engine generator and any electronic component requiring cooling.

A single heat exchanger 18 can combine the cooling of several functions or oil circuits of the turbomachine, and this according to different parameters linked to the need for oil cooling, i.e. inlet temperatures, flow rates, outlet temperature requested or the air conditions, the different circuits can be placed in thermal contact or isolated. The exchanger 18 and in particular its oil passages can withstand a low oil temperature of up to −54° C.

FIG. 2 is a detailed view of the heat exchanger 18 of FIG. 1.

With reference to FIG. 2, the heat exchanger 18 is of the air/oil type with heat exchange surfaces with air 26 which are in contact with the oil passages 24.

The exchange surfaces 26 have a divergent longitudinal section following the tertiary flow F3, i.e. the radial height separating two exchange surfaces 26 downstream of the exchanger is greater than the radial height separating said two exchange surfaces at the upstream of the exchanger. In addition, the exchange surfaces 26 have a cross section which increases along the tertiary flow F3. Preferably, the heat exchanger 18 is a one-piece part obtained by additive manufacturing, and more preferably obtained by laser fusion on a bed of aluminum powder. The exchange surfaces 26 are preferably formed by thin plates, and advantageously, each plate delimits two exchange surfaces 26.

The oil passages 24 are arranged side by side with a number between 1 and 50, and preferably between 5 and 30, and more preferably between 10 and 25. Alternatively, the oil passages 24 can be merged together. so as to form only one channel.

Advantageously, the divergence of the heat exchanger 18 is dimensioned to reduce the air speed by around 25%, i.e. the tertiary flow F3 goes for example from a speed of Mach 0.33 to a number of Mach of approximately 0.2 at the exit of interchange 18.

In order to promote thermal exchanges between the oil passages 24 and the exchange surfaces 26, 60% of the cumulative length of said oil passages 24 extend in longitudinal planes distributed angularly around the longitudinal axis 8, and preferably 80% of the cumulative length, in said longitudinal planes. Advantageously, the oil passages 24 extending in the longitudinal planes are parallel to the direction of air flow.

For this purpose, the remaining 20% of the length of the oil passages 24 correspond to a transition 28 from one longitudinal plane to another allowing the oil to travel circumferentially through the heat exchanger 18. The upstream section 20 of the tertiary flow stream 16 comprises an external casing 30 and an internal casing 32. The upstream section 20 further comprises an external intermediate casing 31 and an internal intermediate casing 33, each of said external 31 and internal 33 intermediate casings is in one piece with the exchanger 18.

Advantageously, the oil passages 24 and/or the exchange surfaces 26 are integrally formed with the external intermediate casing 31 as well as with the internal intermediate casing 33 of the exchanger 18.

The external casing 30 is an integral part of the external intermediate casing 31, and at the same time, the internal casing 32 is an integral part of the internal intermediate casing 33.

In this regard, the outer casing 30 comprises at an upstream end and/or at a downstream end, a fixing flange 34. Preferably, the outer casing 30 comprises two fixing flanges 34 arranged both at the upstream end and at the downstream end of the exchanger 18.

Similarly, the external intermediate casing 31 of the exchanger 18 comprises at its upstream end and/or at its downstream end, at least one fixing flange 36. To this end, each fixing flange 34 is configured to attach to the flange fixing bracket 36 belonging to the exchanger 18. Preferably, the fixing flanges 34, 36 are circumferentially continuous around the longitudinal axis 8.

The direction of assembly of the exchanger 18 in the turbomachine is preferably from downstream to upstream, i.e. in the opposite direction to the tertiary flow F3. In this configuration, the fixing of the exchanger 18 to the external casing 30 can be ensured by screwing. In this configuration, the exchanger 18 is an integral part of the tertiary flow vein 16 and thus ensures the aerodynamic continuity of the tertiary flow F3 within the vein 16.

The fixing of the exchanger 18 with the internal casing 32 can be obtained by means of a rigid connection between a fixing flange belonging to the internal casing 32 with another fixing flange belonging to the exchanger 18, and precisely belonging to a angular sector 38 of the exchanger 18.

Indeed, the angular sector 38 is an integral part of the exchanger 18 and includes an oil inlet passage 40 allowing the distribution of oil in the oil passages 24. In this configuration, the fixing is preferably obtained by screwing between the two flanges (not illustrated) which can be arranged circumferentially around the longitudinal axis 8.

The exchanger 18 comprises over its total extent following the tertiary flow F3, a free portion of material 42 forming a by-pass 42, commonly called air by-pass 42, and can also be called "FOD" bypass, acronym for the English expression "Foreign Object Debris". Indeed, the main role of an air by-pass is to allow the passage of debris contained in the air flow through the turbomachine. Debris or "FOD" can for example be birds, hail, hailstones or any other object that can obstruct or damage the exchanger.

In this regard, the exchanger 18 includes the by-pass 42 to allow debris to pass through the vein 16 without blocking the passage of the tertiary flow F3 through the exchanger 18 or damaging the latter.

In parallel with the air by-pass 42, a protective grid can be placed on the front face of the exchanger 18 to further protect the oil passages 24 and the exchange surfaces 26, and without hindering their ability to heat exchange.

With reference to FIG. 1 and FIG. 2, the air by-pass 42 is adjacent to the external casing 30 of the upstream section 22 of the tertiary flow vein 16. The air by-pass 42 is delimited radially outwards by the external intermediate casing 31 and more precisely delimited radially outwards by an upper face 44 belonging to the external intermediate casing 31 of the exchanger 18, said upper face 44 is adjacent to the first external guide wall 11 belonging to the external casing 30.

The air by-pass 42 is delimited radially inwards by a face 45 belonging to a wall radially delimiting the heat exchange surfaces 26, said wall having a constant radial height.

The air by-pass 42 extends radially over a height corresponding to a maximum of 20% of a total radial height of the upstream section 22 of the tertiary flow stream 16. Preferably, the height of the by-pass of air 42 extends radially to a maximum of 15% of a corresponding total radial height of the divergent longitudinal section of the vein 16.

The air by-pass 42 has a constant radial height over the total extent of the exchanger 18 following the tertiary flow F3. Indeed, the height of the air by-pass 42 remains constant and does not change in any way depending on the flow of the air because it is not desired to modify the speed thereof, only the passage of debris is expected from the air by-pass 42. Advantageously, this makes it possible to limit the difference in pressure losses between the air by-pass 42 and the rest of the exchanger 18.

However, the radial height of the air by-pass 42 can vary in order to compensate for possible pressure losses which may be caused by aerodynamic disturbances downstream of the exchanger. In this regard, the air by-pass 42 may have a converging and/or divergent longitudinal section.

FIG. 3 is a front view, i.e. in the direction of air flow, of the tertiary flow vein 16 comprising the exchanger 18, of the turbomachine of FIG. 1.

With reference to FIG. 3, the exchanger 18 is distributed angularly in the tertiary flow vein 16, in fact, we can consider that a plurality of exchangers 18 in the vein 16 represents a single exchanger 18.

The exchanger 18 comprises several angular sectors 38, each angular sector 38 comprises an oil inlet 48 on the second external guide wall 13 of the radially internal air flow, called the internal wall 13 at an angular end of said sector 38.

The angular sector 38 also comprises at an opposite angular end an oil outlet 50 on the internal wall 13, the opposition of one end relative to the other is relative to a radial axis (not illustrated) located in the middle of the angular sector.

The oil inlet 48 or the oil outlet 50 is integrally formed in the internal wall 13. Preferably, the oil inlet 48 and the oil outlet 50 are integrally formed in the internal wall 13.

FIG. 4 illustrates a simplified sectional view of the exchanger 18 of the turbomachine of FIG. 1, in which the air by-pass 42 is located radially adjacent to the external casing. The exchange surfaces 26 are not shown in order to simplify FIG. 4.

The angular sector 38 comprises an oil distributor 52 extending circumferentially along the internal wall 13 and an oil collector 54 also extending circumferentially along the internal wall 13.

Several angular sectors 38 can comprise a single distributor 52 and a single oil collector 54. In this configuration, a single distributor can for example be connected to several cooling circuits of the axial turbomachine.

The oil distributor 52 includes the oil inlet 48 and the oil collector includes the oil outlet 50. In this regard, the oil passages 24 extend fluidly into the tertiary flow vein between the corresponding oil inlet 48 and the corresponding oil outlet 50.

An oil outlet passage 55 is arranged between the oil passages 24 and the oil collector 54 and a short-circuiting passage can connect the oil inlet passage 40 to the oil outlet passage. oil 55.

With reference to FIG. 2, the angular sector 38 comprises a short-circuiting passage 56 of said sector 38, also called oil by-pass 56, the latter is integrally formed in the internal wall 13 and extends from fluid manner between the oil inlet 48 and the oil outlet 50 along the internal wall 13. The exchanger 18 may include several oil by-passes 56.

Advantageously, the oil by-pass 56 ensures the cold operation of the exchanger 18, in particular at temperatures around −40° C., in fact, the cold oil has a high viscosity which is not suitable to allow its passage into the exchanger 18, the oil therefore passes into the oil by-pass 56 until it reaches a suitable viscosity.

In this regard, another circuit called defrosting circuit (not shown) can be arranged near or in contact with the oil by-pass 56, and can also be in contact with the oil passages 24, the defrosting circuit defrosting can ensure the heating of the oil included in the exchanger 18.

The oil by-pass 56 comprises a normally closed valve 58 and capable of opening in the presence of a pressure difference between the oil inlet 48 and the oil outlet 50, greater than or equal to a value limit. The valve 58 can also open when the viscosity of the oil is too high compared to a previously identified threshold.

The oil inlet 48 is located on a terminal downstream portion of the exchanger 18 while the oil outlet 50 is located on an upstream portion of the exchanger 18. However, the reverse can be achieved or alternatively. Both the inlet 48 and the outlet 50 can be located at the downstream or upstream portion.

It can be seen in FIG. 4 that the oil inlet 48 is at an angular end of the angular sector 38 as well as the oil inlet passage 40, and the oil outlet 50 as well as the oil outlet passage 55 are located in the opposite angular end of the angular sector 38. Advantageously, the oil passages 24 extending from the oil inlet 48 towards the oil outlet 50 extend circumferentially over the entire circumferential extent of the heat exchanger 18, thus making it possible to maximize the heat exchange area between the tertiary flow and the oil.

FIG. 5 represents a partial perspective view of an exchanger 118 according to a second embodiment of the invention. It should be noted that a perspective view of the exchanger 118 is supposed to have an arcuate profile, however FIG. 5 has been greatly simplified in order to facilitate understanding.

Indeed, the first embodiment consists of positioning the air by-pass 42 being adjacent to the external casing 30. While the second embodiment consists mainly of positioning an air by-pass 142, having the same geometric configuration as the air by-pass 42 described previously. In this regard, the exchange surfaces 26 as well as the oil passages and all the other elements forming the exchanger 118 are identical to the exchanger 18.

The air by-pass 142 is configured to be adjacent to the internal casing 32, this involves structural adjustments which will be fully detailed later in this description.

With reference to FIG. 5, the air by-pass 142 is adjacent to the internal casing (not shown) of the upstream section of the tertiary flow vein. The air by-pass 142 is delimited radially inwards by the internal intermediate casing 33 and more precisely delimited radially inwards by a lower face 46 belonging to the internal intermediate casing of the exchanger 118, said lower face 46 is adjacent to the internal casing and particularly adjacent to the internal wall 13 illustrated in the previous figures.

In this configuration, the lower face 46 forms a continuity of the tertiary flow vein with the internal wall 13, we can therefore consider that the air by-pass 142 is delimited radially towards the interior by the internal wall 13.

The air by-pass 142 is delimited radially towards the outside by a face 47 belonging to a wall radially delimiting the heat exchange surfaces 26, said wall having a constant radial height.

The choice of the embodiment of the present invention can be made as a function of the overall arrangement of the different elements of the axial turbomachine, and more precisely as a function of the radial position of the top of one of the blades of the movable wheel relative to the heat exchanger 18, 118 in combination with the geometric shape of the second external guide wall 13 as indicated in FIG. 1.

Indeed, the modification of the position of the top of the blade of the moving wheel and the geometric shape of the wall of the tertiary flow vein, results in the modification of the trajectory of the "FOD" debris.

Advantageously, the exchanger 18, 118 can be manufactured and adapted according to the architecture of the turbomachine in which it will be mounted in order to anticipate the radial part of the vein 16 which includes the greatest risk of impact with debris so that the air by-pass 42, 142 is arranged there.

FIG. 6 shows a sectional view from above of the exchanger 118 in the tertiary flow vein according to the second embodiment.

The turbomachine comprises structural arms 60 adjacent to the angular sectors and extending radially in the tertiary flow vein at junctions between said angular sectors of the exchanger 118.

Each angular sector of the exchanger 118 extends circumferentially between two structural arms 60, thus in the case where the exchanger 118 is angularly subdivided in the tertiary flow vein, said subdivision can be ensured by the structural arms 60.

The structural arms 60 are arranged axially downstream of the stator in the tertiary flow vein, and preferably between the low pressure compressor and the high pressure compressor.

Each structural arm 60 comprises an upstream portion comprising a leading edge, the exchanger 118 is arranged downstream of the latter. Advantageously, this arrangement makes it possible to further minimize the aerodynamic disturbances of the tertiary flow F3 which can be caused by the moving wheel.

The structural arm 60 has a cross section with a width decreasing over a downstream half of said section forming a converging downstream portion 62 of the structural arm 60.

The downstream portion 62 of each structural arm 60 comprises a trailing edge, the exchanger 118 is arranged upstream of said trailing edge. Preferably, the exchanger 118 is arranged between the leading edge and said trailing edge.

Advantageously, this makes it possible to improve the rigidity of the assembly of the exchanger 118 in the turbomachine and to better control pressure losses and aerodynamic disturbances. In addition, the leading edges of the structural arms 60 make it possible to promote heat exchange in convection between the oil and the tertiary flow F3.

The exchanger 118 extends circumferentially between two structural arms so that said exchanger 118 is in direct contact with at least one of the two structural arms, and preferably in direct contact with each of the two structural arms 60. In this configuration, the heat exchange surfaces 26 are adjacent to the downstream portions 62 of the structural arms 60.

Indeed, we can see in FIG. 6 that the exchanger 118 is adjacent in the axial and circumferential direction to the downstream portions 62 of the structural arms 60. Thus, the exchanger 118 is circumferentially in direct contact (glued) with the downstream portions 62 while axially overlapping at least 80% of a total axial extent of said downstream portions 62. The term "adjacent" here means that the exchanger 118 is in contact with at least 80% of the downstream portions 62.

Preferably, the heat exchange surfaces 26 have a diverging circumferential profile conforming to the downstream portions 62 of the structural arms 60.

Advantageously, this makes it possible to limit the pressure losses and to increase the efficiency of the heat exchange between the tertiary flow and the oil within the exchanger 118.

The circumferential profile diverging from the heat exchange surfaces 26 is formed by lateral profiles 64 directly adjacent to the structural arms 60 and each comprising the downstream portion 62. In this regard, each downstream portion 62 comprises at least one inclined lateral profile 65, this the latter is inclined relative to an axial direction and extends over at least 5% of the corresponding lateral profile 64.

The inclined side profile 65 has an average inclination which depends on its axial extent relative to that of the side profile 64, the inclination can vary between 5° and 60°.

Preferably, the inclination of the inclined side profile 65 is of the order of 30° relative to the side profile 64, said inclination preferably extends over 30% of the axial length of the structural arm 60.

The oil passages 24 can partly or entirely follow the inclination of the inclined lateral profile 65 of the structural arms 60.

It should be noted that the arrangement of the oil inlet as well as the oil outlet in the angular sector of the exchanger 118 depends on the embodiment of the invention.

Indeed, FIG. 6 illustrates the second embodiment in which the air by-pass 142 is delimited radially inwards by the internal casing. In this regard, for each angular sector of the exchanger 118, the oil inlet passages 40 and oil outlet 55 are located at the level of the downstream half 62 in axial projections 61 of the cross section of more large width of structural arms 60.

The axial projections 61 are called terminal downstream portions 61, the oil inlet passages 40 and oil outlet 55 are arranged in said terminal downstream portions 61. This further makes it possible to move the oil inlet circumferentially away from the oil outlet in order to maximize the circulation of the oil within the exchanger 118 inside the tertiary flow vein.

Preferably, the exchanger is arranged axially at the level of the greatest width of the structural arms 60, this advantageously makes it possible to facilitate the assembly of said exchanger which is done from downstream to upstream.

Preferably, the oil inlet and/or the oil outlet are located at a distance from a downstream edge 63 of the exchanger 118 which is less than 20% of its total axial extent, and more preferably, at a distance less than 5% of its total extent.

It can be seen in FIG. 6 that the oil inlet at the oil inlet passage 40 and the oil outlet at the oil outlet passage 55 are circumferentially aligned. The oil inlet and the oil outlet are both at a distance from the downstream edge 63 of between 5% and 20% of the total axial extent of the exchanger 118.

The air by-pass 142 is delimited circumferentially by the sides 43, the latter can conform to the side profile 64, in FIG. 6, the sides 43 do not conform to the inclined side profile 65.

The oil inlet passage 40 as well as the oil outlet passage 55 extend radially and laterally to the air by-pass 142, the latter two being spaced apart from each other by a distance greater than the circumferential width of the air by-pass 142, i.e. between two sides 43.

Preferably, the oil inlet passage 40 is distant from the oil outlet passage 55 by a distance greater than at most 20% more than the circumferential width of the air by-pass 142, and more preferably, from a distance greater than a maximum of 5% more than the circumferential width of the air by-pass 142.

It should be noted that the arrangement of the oil inlet passage 40 and the oil outlet passage 55 illustrated in FIG. 6 may be suitable for the exchanger 18 according to the first embodiment.

FIG. 7 represents a partial above view of the exchanger 18 or 118 illustrating a third embodiment of the invention in which the exchanger 18, 118 presents an evolution of the number per unit area of its exchange surfaces 26, called density evolution, located in a portion 66 adjacent to the structural arms 60, relative to the number per unit area of the exchange surfaces 26 located in a central part 68.

The adjacent portion 66 can be considered as being a boundary layer to the exchanger, and the evolution of the density is in the circumferential direction and is at least 20% and preferably 50%.

The exchanger 18, 118 therefore has 50% more exchange surfaces 26 at the adjacent portion 66 compared to the number of exchange surfaces at the central part 68.

Advantageously, the evolution of density in the circumferential direction makes it possible to slow down the air and accompany its flow to the downstream portion 62, thus promoting thermal exchanges between the oil and the air. The reduction in pressure losses and the reduction in the generation of drag at the level of the flow of the tertiary flow F3 also present another advantage of the invention.

FIG. 8 illustrates the evolution of the density of the exchange surfaces 26 in the axial and circumferential direction.

The exchange surfaces 26 of the exchanger have a cross section having a pattern preferably in hexagonal form, however, in order to illustrate the evolution in a simplified manner, a rectangular pattern has been illustrated in FIGS. 7 and 8.

With reference to FIG. 7 and FIG. 8, the number of exchange surfaces 26 per unit area increases in the adjacent part 66 as the circumferential increase in the cross section at the tertiary flow F3.

Indeed, the flow of the tertiary flow F3 gradually diverges in the circumferential direction to follow the inclined lateral profile 65 of the downstream portion 62 of each structural arm 60.

For this purpose, the increase in the number of exchange surfaces 26 per surface unit is done according to one or more sectors 67, 69, and between each sector of the adjacent part 66, the increase per surface unit of the number of the exchange surfaces 26 is at least 20% and preferably 50%.

The evolution of the density of the exchange surfaces is also possible in the radial direction by following the divergence of the tertiary flow vein in the longitudinal section, this allows to have the same advantages as the evolution of the density in the axial and circumferential directions.

Advantageously, the arrangement of the heat exchanger according to the invention and in particular the divergent tertiary flow vein, makes it possible to supply the exchanger with sufficiently cold and sufficiently slow air so that both the cooling efficiency oil is ensured and that the aerodynamic losses linked to the presence of the exchanger are limited, thus promoting the thrust of the aircraft while contributing to the reduction of carbon dioxide emissions.

It should be noted that the invention is not limited to the examples described in the figures. The teachings of the present invention may in particular be applicable to another type of turbomachine.

Each technical characteristic of each illustrated example is applicable to the other examples. In particular, the evolution of the density of the heat exchange surfaces can be applied to the exchanger in three directions, with an air by-pass radially adjacent to the external or internal casing.

The invention claimed is:

1. An axial turbomachine, comprising:

a first separation nozzle capable of separating an incoming air flow into a radially internal air flow and a radially external air flow, called secondary flow;

a second separation nozzle capable of separating the radially internal air flow into a primary flow and a tertiary flow in a tertiary flow vein radially external to said primary flow; and a heat exchanger disposed in the tertiary flow vein, wherein said tertiary flow vein is annular and circumferentially continuous over 360° around a longitudinal axis of the turbomachine;

wherein the turbomachine comprises a stator traversed by the tertiary flow and arranged upstream of the heat exchanger, said stator being configured to straighten said tertiary flow, the heat exchanger extends radially and axially only within a divergent longitudinal section of an upstream section of the tertiary flow vein, said tertiary flow vein comprising a downstream section having a converging longitudinal section, following the tertiary flow.

2. The axial turbomachine according to claim 1, wherein the heat exchanger is arranged axially between a low pressure compressor and a high pressure compressor.

3. The axial turbomachine according to claim 1, wherein said axial turbomachine comprises a movable wheel traversed by the radially internal flow, said movable wheel being arranged upstream of said stator.

4. The axial turbomachine according to claim 1, wherein the heat exchanger is an air/oil heat exchanger with oil passages and heat exchange surfaces with the air, in contact with said oil passages, said oil passages and said heat exchange surfaces having a divergent longitudinal section following the tertiary flow.

5. The axial turbomachine according to claim 4, wherein the oil passages extend, over at least 80% of a cumulative length of said oil passages, in longitudinal planes distributed angularly around the longitudinal axis.

6. The axial turbomachine according to claim 1, wherein the upstream section of the tertiary flow vein comprises an external casing forming an integral part of an external intermediate casing, said external intermediate casing is integral with the heat exchanger.

7. The axial turbomachine according to claim 6, wherein the upstream section of the tertiary flow vein comprises an internal casing forming an integral part of an internal intermediate casing, said internal intermediate casing being integral with the heat exchanger.

8. The axial turbomachine according to claim 7, wherein the oil passages and/or the heat exchange surfaces with air are integrally formed with the external intermediate casing and/or the internal intermediate casing being integral with the heat exchanger.

9. The axial turbomachine according to claim 1, wherein the heat exchanger comprises, over a total extent of the heat exchanger following the tertiary flow, a free portion of material forming an air by-pass.

10. The axial turbomachine according to claim 9, wherein the air by-pass is adjacent to the external casing of the upstream section of the tertiary flow vein.

11. The axial turbomachine according to claim 10, wherein the air by-pass is delimited radially outwards by the external intermediate casing.

12. The axial turbomachine according to claim 10, wherein the air by-pass is delimited radially outwards by an upper face belonging to the external intermediate casing of the exchanger thermal, said upper face being adjacent to the external casing.

13. The axial turbomachine according to claim 9, wherein the air by-pass is adjacent to the internal casing of the upstream section of the tertiary flow vein.

14. The axial turbomachine according to claim 13, wherein the air by-pass is delimited radially inwards by the internal intermediate casing.

15. The axial turbomachine according to claim 13, wherein the air by-pass is delimited radially inwards by a lower face belonging to the internal intermediate casing of the heat exchanger, said lower face being adjacent to the internal casing.

16. The axial turbomachine according to claim 9, wherein the air by-pass extends radially over a height corresponding to a maximum of 15% of a corresponding total radial height of the divergent longitudinal section of the tertiary flow vein.

17. The axial turbomachine according to claim 9, wherein the air by-pass has a constant radial height over the total extent of the heat exchanger following the tertiary flow.

18. The axial turbomachine according to claim 1, wherein the first separation nozzle comprises an internal wall forming a first external guide wall of the radially internal air flow, said first external guide wall forming a convex profile seen from said radially internal air flow upstream of the heat exchanger.

19. The axial turbomachine according to claim 1, wherein the second separation nozzle comprises an external wall forming a second external guide wall of the radially internal air flow having passed through a moving wheel, said second external guide wall forming a convex profile seen from the tertiary flow upstream of the heat exchanger.

20. The axial turbomachine according to claim 1, wherein the internal casing comprises a "VBV" channel having an outlet disposed at the level of the tertiary flow vein, said outlet being arranged downstream of the heat exchanger.

* * * * *